(12) United States Patent
Pofahl et al.

(10) Patent No.: US 11,308,740 B2
(45) Date of Patent: Apr. 19, 2022

(54) METHOD FOR LOCATING A CAUSE OF THE PREMATURE DISCHARGE OF A BATTERY IN A VEHICLE

(71) Applicant: Ford Global Technologies, LLC, Dearborn, MI (US)

(72) Inventors: Ekkehard Pofahl, Kürten (DE); Christoph Arndt Dr habil, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 16/563,299

(22) Filed: Sep. 6, 2019

(65) Prior Publication Data
US 2020/0098204 A1 Mar. 26, 2020

(30) Foreign Application Priority Data
Sep. 25, 2018 (DE) .......................... 102018216288.3

(51) Int. Cl.
| G07C 5/08 | (2006.01) |
| G07C 5/04 | (2006.01) |
| G07C 5/00 | (2006.01) |
| H02J 7/00 | (2006.01) |
| H04L 67/12 | (2022.01) |
| B60W 50/00 | (2006.01) |
| B60L 58/12 | (2019.01) |
| B60L 3/12 | (2006.01) |

(52) U.S. Cl.
CPC ........... *G07C 5/0808* (2013.01); *G07C 5/008* (2013.01); *G07C 5/04* (2013.01); *G07C 5/085* (2013.01); *H02J 7/0063* (2013.01); *B60L 3/12* (2013.01); *B60L 58/12* (2019.02); *B60W 50/00* (2013.01); *B60W 2050/0083* (2013.01); *B60Y 2200/91* (2013.01); *H04L 67/12* (2013.01)

(58) Field of Classification Search
CPC .................................................. G07C 5/0808
See application file for complete search history.

(56) References Cited

U.S. PATENT DOCUMENTS

| 4,902,956 | A | * | 2/1990 | Sloan | H02J 7/0029 320/135 |
| 6,066,899 | A | * | 5/2000 | Rund | H02J 7/0031 307/10.7 |
| 9,904,531 | B2 | * | 2/2018 | Suzuki | G06F 8/65 |
| 10,293,701 | B2 | * | 5/2019 | Shin | B60L 58/10 |
| 10,812,998 | B2 | * | 10/2020 | Kavars | G06F 1/266 |
| 2020/0098204 | A1 | * | 3/2020 | Pofahl | G07C 5/008 |

* cited by examiner

*Primary Examiner* — Michael A Berns
(74) *Attorney, Agent, or Firm* — Frank Lollo; Eversheds Sutherland (US) LLP

(57) ABSTRACT

The invention relates to a method for locating a cause of the premature discharge of a battery in a vehicle.

To simplify locating a cause of the premature discharge of a battery in a vehicle, it is proposed to monitor the current drawn from the battery via an electrical system of the vehicle in the ignition-off-state. Data collected as part of the monitoring can then be examined either alone or in conjunction with additional, in particular, vehicle-specific and/or global data, for information relevant to isolating and/or determining the cause.

18 Claims, No Drawings

METHOD FOR LOCATING A CAUSE OF THE PREMATURE DISCHARGE OF A BATTERY IN A VEHICLE

CROSS-REFERENCE TO RELATED APPLICATIONS

This application claims priority to and the benefit of German patent application No. 102018216288.3, filed Sep. 25, 2018, which is hereby incorporated by reference herein in its entirety.

The invention relates to a method for locating a cause of the premature discharge of a battery in a vehicle. Also, the invention relates to an arrangement for carrying out the method and an analysis system comprising this arrangement.

Increasingly complex designs of motor vehicles are manifested especially in their ever more complex and numerous electrical systems. With each new component to be integrated, interactions within and between the individual auxiliary systems increase accordingly. The increasing number of possible system states and state transitions requires ever more complex and extensive tests. Comprehensive system tests producing a satisfactory result are now difficult if not impossible to achieve at the factory.

An important indication of any defects in system components or auxiliary systems and of their possible unfavorable or even incorrect design and control is the level of the "power consumption during the ignition-off-state" of a vehicle; this is known as the "Key-Off-Load" (KOL). This means a phase in which the engine of the vehicle is stopped and the ignition is switched off. Usually, even in such phases at least one auxiliary system or at least one component is active, the power supply for which is then provided exclusively via the vehicle's internal battery. Examples of these are alarm or locking systems. Unusually high power consumption in the "Ignition-off state" can lead to premature discharge of the battery, which gives rise to unexpected but ultimately inevitable breakdown of the vehicle. In addition to the warranty case that may then ensue, in particular the confidence in and satisfaction with the vehicle are diminished. Since the so-called "stranding" of vehicles is included in public breakdown statistics, new potentially interested customers will also be negatively affected in terms of their future buying decisions.

On the part of customers as well as dealers the result of a possible fault is initially only noticeable in the form of a flat battery. Even the readout from a fault memory can in most cases provide no further information, since information is usually stored only during operation and not in the ignition-off-state of the vehicle.

The unexamined application US 2017/0242678 A1 discloses a system and a method for a vehicle, in which after detection of the ignition-off-state a software-version stored in the primary memory is replaced by a software-update held in reserve in the secondary memory. For this to work, the old version of the software must first be deleted from the primary memory before the new version is loaded from the secondary memory into the primary memory. This is followed by a function test of the new software-version. In the event of an error during the installation the primary memory is deleted again and the new software-version is reloaded. The new software-version can then be tested for its ability to be executed. The transfer of the software-updates into the secondary memory can be carried out wirelessly so that there is no longer a need to find a distributor.

In the unexamined Chinese application CN 103 246 280 A an electrical vehicle diagnostic system was disclosed. The system is a fault and lifetime online diagnostic system for an electric vehicle. This comprises: an ECU-microcontroller, a power conservation module and an electronic control software module. In the ignition-off state, the ECU-microcomputer is supplied with power via the power conservation module until after the completion of a fault and lifetime data-saving function a software-controlled disconnection of the power supply is carried out.

The U.S. Pat. No. 9,443,358 B2 is directed in general to systems and methods for updating software stored in a vehicle. The update to be performed automatically is carried out via a telematic-channel, which may be an internet channel that links to a dealer/manufacturer database. To this end, the system sends data over the internet, containing information on the individual vehicle components as well as the usage and any error reports. The incoming data allow analyses and comparisons against a central data base at the manufacturer. A software upgrade for the vehicle can then be created and made available as an update in order to resolve the identified problem.

The U.S. Pat. No. 7,761,389 B2 discloses a method of predicting damaging loads on a vehicle battery. The method comprises processing of data concerning the state of charge of the battery as well as a duration factor. Using a machine learning algorithm a prediction is made about the expected state of charge of the battery during start-up. If the predicted initial charge state within the operating time falls below a threshold value, a corresponding warning is issued.

The unexamined application US 2015/113 521 A1 discloses a computer-readable medium with a piece of software stored thereon. The software is used for executing a process which comprises receiving an update request for a program, which is designed for controlling equipment mounted on a motor vehicle. In accordance with the update request the process comprises the classification of various correction programs into a plurality of groups. The classification is performed on the basis of available electrical energy from a battery which corresponds to a vehicle type to which the motor vehicle belongs. In addition, a quantity of the usable energy is stored in a storage device, with the classified correction programs for each of the previously classified groups being transferred to the vehicle.

The U.S. Pat. No. 8,019,501 B2 discloses a method for predicting errors in vehicle components, in which sensors mounted on the vehicle supply data from the individual components. The data obtained in this way are examined for possible patterns, wherein by analysis of the detected patterns a prediction is made concerning faults in the components. Information obtained about predictable faults is sent to the respective user, owner, distributor and/or manufacturer of the vehicle, to allow preventative and corrective measures to be taken. An appropriately equipped vehicle with a facility for remote telematics comprises sensors arranged in such a way that they supply data concerning the condition of the vehicle or the components. The vehicle also comprises a processor for receiving the supplied sensor data and transforming them into an output signal, which provides information about the diagnosed condition of the vehicle or its component/s. The output signal can be transmitted via a communication unit, which can set up a communication channel to a distributor or manufacturer of the vehicle at a remote location from the vehicle.

Even if these methods and systems monitor the charge state of the battery with regard to a sufficient amount of energy for pending activities and can resolve any program errors by software updates, any cause leading to the unexpected draining of the battery first requires time-consuming investigations. Only once the specific trigger has been detected can targeted measures be implemented to solve the resulting problem. However, even reading out the fault memory, now fitted as standard, seldom provides insightful information. in order to further reduce breakdowns due to a flat battery and accompanying negative impact on manufacturers' warranty-related costs and customer satisfaction and future purchasing decisions, the previously known methods and systems therefore certainly still allow scope for improvement.

Against this background, the object of the present invention is to present a method for locating a cause of the premature discharge of a battery in a vehicle, in particular more easily. In addition, an arrangement provided for carrying out the method as well as an analysis system comprising this arrangement will be presented.

The solution to the method-related part of this problem is specified according to the invention in a method. The substantive part of this object is achieved by an arrangement and by an analysis system.

According to these, the method according to the invention comprises the measures according to which in the ignition-off state of the vehicle, the current drawn from the battery by its electrical system is monitored, the data related to the current consumption collected during the monitoring being examined either alone or in conjunction with additional data for information relevant to isolating and/or determining the cause. The additional data may be in particular vehicle-specific and/or global data.

The resulting advantage is the fact that an active monitoring of the electrical system with regard to the consumption of current from the battery, carried out in the ignition-off state of the vehicle, is now proposed. In other words, in this case the consumption of current from the battery is monitored in the phases in which the vehicle is not operational. As a result, the search for the cause of the unusually high current consumption, which usually only begins once the effects (for example, a breakdown) of an unexpectedly discharged battery are detected, can become redundant. Due to the proposed monitoring during the ignition-off state, the method according to the invention allows the isolation and/or determination of the cause at a time in which the inevitably impending effects will not necessarily occur.

According to a particularly preferred refinement of this basic idea of the invention, the monitoring of the electrical system can be carried out while the vehicle is being used in the intended manner. This means a normal usage in addition to stationary periods outside of a scheduled or unscheduled workshop visit. Alternatively or in addition, this also applies to the examination of the data, which in a particularly preferred manner can be carried out during said intended use of the vehicle.

This increases the satisfaction of the person using the vehicle, since due to a possible intervention at an early stage the effects of the discharged battery will not even necessarily occur. At the same time, distributors and/or vehicle manufacturers are protected against the costs of sometimes lengthy workshop visits that are needed to find the particular cause, albeit too late, and initially are not infrequently limited to a simple replacement of the battery, which is possibly misdiagnosed as defective.

In particular in the context of possible production defects this allows a strategy to be developed as early as possible, to be able to take appropriate measures for the vehicles concerned on the basis of the fault isolated and/or determined according to the invention.

The invention proposes that the collected data are initially stored in the vehicle, the actual examination of the data then being carried out outside of the vehicle. The investigation can then preferably take place at the vehicle manufacturer, since in addition to its generic interest in a satisfactory functioning of its vehicles it also has access to further information about its vehicles that can be used to isolate and/or determine the cause of the abnormal power consumption. In an advantageous way, data from a range of different vehicles can thus be collected and investigated centrally.

In the light of possible causes for the power consumption detected as adverse, it is provided that the collected and/or other data can be examined for the presence of a software and/or hardware problem in the electrical system of the vehicle. Thus merely a change to the activation of the electrical system, of one of its parts or components via a replacement or update of the relevant software might be sufficient to resolve the particular cause of the abnormal power consumption leading to a premature draining of the battery. Alternatively or in addition, at least one piece of hardware of the electrical system may be located, which is responsible for the unusual power consumption due to its defect or its incorrect design.

With regard to the data to be collected, various types of content are conceivable that would allow the cause to be isolated and/or determined as accurately as possible. Particularly preferably, the collected data can contain at least one of the types of information listed below, which can be allocated to a part of the electrical system or one of its components:
  time of the current consumption,
  size of the current consumption,
  duration of the current consumption,
  pattern of the current consumption, in particular continuous or periodic.

The association made between a piece of information and a part or a component of the electrical system allows conclusions to be drawn regarding its faulty functioning that requires modification, in order to eliminate the cause thus found using a highly targeted measure.

With regard to the additional data, it is considered advantageous if the collected data are examined together with at least one of the following types of content in connection with the following list of additional data:
  system identification,
  on-board network identification,
  battery identification,
  historical data collected from the same vehicle,
  data collected from a different, in particular comparable or identically designed vehicle,
  information stored during regular maintenance of the vehicle,
  information stored during regular maintenance of a different, in particular comparable or identically designed vehicle,
  information stored during an unscheduled visit to the workshop by the vehicle,
  information stored during regular maintenance of a different, in particular comparable or identically designed vehicle,
  information stored during an unscheduled visit to the workshop by a different, in particular comparable or identically designed vehicle,
  driving behavior of the person using the vehicle,
  driving behavior of the person using a different, in particular comparable, vehicle, time of a hardware replacement or repair in the electrical system, time of a software replacement or update in at least a part of the electrical system.

It is thus possible, for example, to identify a previously implemented software update and/or a previous hardware replacement as the cause of an increased power consumption which is only noticed at a later date. Furthermore, the cross-vehicle information can be used to reveal possible correlations between design, operation and usage behavior, the totality of which leads to a premature draining of the battery. This would also allow purely prophylactic measures be taken in advance to counter the effects of a varying power consumption due to the possible change of the person using the vehicle.

According to a particularly preferred configuration of the method according to the invention, the collected data stored in the vehicle can be transmitted to the manufacturer of the vehicle via a wireless or wired connection. This can be carried out during a scheduled or unscheduled workshop visit by the vehicle, in which the collected data stored in the vehicle can be indirectly forwarded to the manufacturer via the approved workshop. Alternatively, an existing connection in the approved workshop can also be used to send the data directly to the manufacturer. Particularly preferably, the collected data can also be transmitted over a possible connection outside the workshop, for example an internet connection to be described in more detail later in relation to the transfer of software to the vehicle, or via a local transmit/receive system.

In principle the identified cause of the premature draining of the battery can be resolved during a scheduled or unscheduled workshop visit by the vehicle. The basis for the decision could be information about when the next regular workshop visit—for example, as part an inspection—is expected. This would presuppose that the vehicle has a complete previous history in relation to this issue, so that the next regular workshop visit can be expected to be observed. Provided no premature failure of the vehicle is expected within the period remaining until the said workshop visit, the repair could then be postponed. But if the period of time were excessive and/or the vehicle does not have a fully observed service history in this respect, an invitation for an unscheduled visit to the workshop would be more appropriate. The correction of a previously found cause as part of a regular workshop visit has the advantage that the person using the vehicle does not need to make extra journeys, and also otherwise does not receive potentially disconcerting information about a detected problem. Of course, this also reduces the costs for the manufacturer or the workshop.

If the cause were to be identified in the form of a software problem which is responsible for the premature draining of the vehicle battery, then the invention provides for the installation of software transferred to the vehicle earlier from an external source by wired or wireless means to eliminate the cause.

According to a particularly advantageous refinement in relation to the possible wireless transmission of software to the vehicle, it is proposed that this can be carried out over an internet connection that can generally be set up at any time or via a wireless connection usable in the area around a local transmit/receive system, which is thus spatially limited.

In particular by the use of a mostly broad-coverage wireless internet connection it is possible to eliminate the software-related cause, at least in urban areas, at virtually any time and at almost any location of the vehicle. This can even be carried out in such a way that the person using the vehicle has no knowledge of this, since the automated fault correction runs in the background.

The arrangement of a local transmit-receive system offers the possibility that any software is then transmitted to the vehicle as soon as it is located within a range around the transmit-receive system or passes through it. Another possibility would be a specific invitation on the part of the manufacturer to visit a nearby approved workshop without a specific appointment, in order to transfer the software required to eliminate the cause as part of a brief visit in its area or by driving past it. This also includes the facility to use a transmit-receive system located for example at the residence of the vehicle user, in the form of an internet-enabled router or wireless router.

With regard to the previously indicated possibilities for transferring a piece of software for eliminating an identified cause, it is conceivable for this to be sent either just to the one vehicle or directly to a plurality of in particular comparable or identically designed vehicles. If the detected cause is one which can be expected to affect or already affects not only the individual vehicle but a number of similar or identically designed vehicles, the consecutive or simultaneous transmission of the software to a plurality of such vehicles offers corresponding economic advantages. In this way, the subsequent storage and transmission to the manufacturer of data collected in the ignition-off state can be used to identify whether the previously transferred software has effectively eliminated the cause. If this is not the case, the next step again allows the facility to create and transfer a further piece of software in order to resolve the identified problem. Overall it is conceivable that the software created is ultimately transmitted to all other known, in particular, comparable or identical vehicles only after the cause has been successfully eliminated, whereas previously only one or a few vehicles were equipped with the new software as part of a test.

With regard to the storage of the data to be collected, it is proposed that this can be collected by means of at least one measuring device associated with a component and/or a part of the electrical system of the vehicle. Alternatively or in addition to this, the data to be collected can also be read out of a component and/or a part of the electrical system, provided that they are designed for the temporary storage of such data. Here there will sometimes be a need for the relevant components and/or parts of the electrical system to be appropriately configured.

The method according to the invention now introduced allows a much simpler location of causes for the premature discharge of a battery in a vehicle. The core of the inventive idea is that it is not necessary for a noticeable impact on the vehicle user—such as its complete breakdown—to occur before appropriate measures to prevent a prematurely discharged battery can be taken. Depending on the cause, it is also no longer absolutely necessary to visit a workshop, which would otherwise be necessary to correct the fault, provided that there is another possible way to transfer the software that eliminates the cause of the fault.

The method according to the invention enables the automatic monitoring and detection, as well as evaluation, of an abnormal and, in particular, excessive current consumption in the ignition-off state of the vehicle. Because of the potential central fusion of collected data, a comparison of the current consumption taking place in the ignition-off state can be made with historical values of the same, which can originate in particular from the same and/or from vehicles of the same model.

Overall, the otherwise difficult and time-consuming procedure in practice of determining the cause of excessive current consumption in the ignition-off-state of the vehicle can be substituted by a virtually round-the-clock monitoring and search for solutions, especially across a range of vehicle types.

The invention also relates to an arrangement for carrying out the method according to the invention previously described in detail, which comprises a memory module at least indirectly coupled to at least a part of an electrical system of a vehicle. The arrangement according to the invention can be fitted directly at the factory or else retrofitted, in order to be able to carry out the method according to the invention.

The advantages resulting from the arrangement according to the invention have already been demonstrated in the context of the method according to the invention or at least addressed in a broad sense, so that, with a view to avoiding repetitions reference is made at this point to the above comments.

It is also provided that the memory module of the arrangement according to the invention can be coupled via at least one measuring means to at least a part of the electrical system or one of its components. Alternatively or in addition to this, the memory module can be designed for reading from at least one part of the electrical system or one of its components.

In terms of a demand-oriented use of the method according to the invention, it is considered to be particularly advantageous if the vehicle-internal monitoring itself examines the consumption of current from the battery for an excessive and/or abnormal value. This makes it possible to reduce the collection of data to time segments with abnormal power consumption levels, wherein the collection of data would not start until an abnormality recognizable during the examination begins. In connection with the vehicle-internal examination, the collected data can advantageously be transferred to the manufacturer of the vehicle only if an excessive and/or abnormal value is found. It is thus as certain as possible that the data transmitted to the manufacturer have a corresponding meaning, whereupon they can be examined. To this end, the collected data can be transmitted together with a warning notice to highlight the importance of their obviously necessary investigation.

According to an advantageous development the collection of data can be modified if necessary. In this case, the sampling can be increased, for example in terms of its rate, to enable more detailed information to be obtained about suspicious processes within the electrical system of the vehicle. Alternatively or in addition to this, the change in the collection of data can also relate to their origin, so that, for example, increased focus is placed on at least one subsystem and/or one component of the system to investigate its behavior more closely. The instruction to modify the collection of data can be issued, for example, preferably by the agency examining the data, for example the manufacturer. One possibility would be an appropriate feedback by the manufacturer to the vehicle or vehicles, where data previously transmitted to the manufacturer give due cause for such a change.

In addition, the invention relates to an analysis system for carrying out the method according to the invention previously described in detail, which comprises an arrangement according to the invention as previously described, and a stationary central unit. The central unit is used for the examination of the collected data transmitted to the central unit by the arrangement, wherein said examination can be carried out in particular together with additional data stored in the central unit and/or transferred together with the collected data.

The advantages resulting from the analysis system according to the invention have already been demonstrated in the context of the method according to the invention or at least addressed in a broad sense, so that, with a view to avoiding repetitions reference is made at this point to the above comments.

In accordance with a preferred design the analysis system according to the invention can have an interface which is configured for data exchange between the arrangement and the stationary central unit. In this case, the interface can be designed either in wireless and/or wired form.

The invention claimed is:

1. A method for locating a cause of a premature discharge of a battery in a vehicle, the method comprising:
    monitoring, in an ignition-off state, a current drawn from the battery via an electrical system of the vehicle;
    examining data collected during the monitoring alone or in conjunction with vehicle-specific and/or global data for information relevant to isolating and/or determining the cause of the premature discharge;
    modifying a sampling rate of the data associated with the cause of the premature discharge;
    identifying the cause of the premature discharge as a software problem; and
    eliminating the cause of the premature discharge by installing software previously transmitted to the vehicle from an outside source over a wired or wireless connection.

2. The method according to claim 1, wherein the monitoring of the electrical system and/or the examining of the data is carried out as part of a normal use of the vehicle outside of a workshop visit.

3. The method according to claim 1, wherein the data is stored in the vehicle, wherein the examining of the data takes place outside of the vehicle centrally by a manufacturer of the vehicle.

4. The method according to claim 3, wherein the data stored in the vehicle is transmitted via a wireless or wired connection directly or indirectly to the manufacturer of the vehicle.

5. The method according to claim 4, wherein the monitoring examines a consumption of current from the battery for a value, wherein only in an event of the value is the transferred to the manufacturer of the vehicle together with a warning notice.

6. The method according to claim 1, further comprising examining the data for a hardware problem in the electrical system of the vehicle.

7. The method according to claim 1, wherein the data comprises a time, size, duration, and pattern of a current consumption pattern that can be allocated to a part of components of the electrical system, wherein the pattern of the current consumption pattern is either continuous or periodic.

8. The method according to claim 1, further comprising examining additional data, wherein the additional data includes:
    system identification,
    on-board network identification,
    battery identification,
    historical data collected from the vehicle,
    data collected from a different comparable or identically designed vehicle, information stored during regular maintenance of the vehicle, information stored during regular maintenance of a different comparable or identically designed vehicle, information stored during an unscheduled visit to a workshop by the vehicle, information stored during regular maintenance of a different comparable or identically designed vehicle, information stored during an unscheduled visit to the workshop by a different comparable or identically designed vehicle, driving behavior of a person using the vehicle, driving behavior of a person using a different comparable, vehicle, time of a hardware replacement or repair in the electrical system, and/or time of a software replacement or update in at least a part of the electrical system.

9. The method according to claim 1, wherein the cause of the premature discharge of the battery of the vehicle is resolved during a scheduled or unscheduled workshop visit.

10. The method according to claim 1, wherein the software is transmitted to the vehicle over an internet connection or a radio connection that is usable in an area around a local transmit/receive system, operated for or by a manufacturer of the vehicle or an authorized dealer.

11. The method according to claim 1, wherein the software is transferred only to the vehicle or a plurality of comparable or identically designed vehicles, wherein after a successful resolution of the cause of the premature discharge, the software is transferred to all other known comparable or identically designed vehicles.

12. The method according to claim 1, wherein the data is collected by at least one measuring device associated with a component and/or a part of the electrical system.

13. The method according to claim 1, wherein the data is read out of a component and/or a part of the electrical system.

14. A system for carrying out the method according to claim 1, the system comprising a memory module which is at least indirectly coupled to the electrical system of the vehicle.

15. The system according to claim 14, wherein the memory module is coupled via at least one measuring device to the electrical system.

16. The system according to claim 14, wherein the memory module is designed for reading from the electrical system.

17. The system according to claim 14, further comprising a stationary central unit for examining the data transferred to the stationary central unit together with additional data stored in the central unit and/or transferred together with the data.

18. The system according to claim 17, further comprising an interface configured for data exchange with the stationary central unit, wherein the interface is implemented by wireless and/or wired connections.

* * * * *